(12) United States Patent
Lim

(10) Patent No.: US 12,283,108 B1
(45) Date of Patent: Apr. 22, 2025

(54) SYSTEM AND METHOD FOR DISCOVERING ANOMALOUS CONSTRUCT VIA COGNITIVE ABSTRACTION IN A MULTIMODAL SENSORY FUSION ECOSYSTEM

(71) Applicant: CERTIS CISCO SECURITY PTE LTD, Singapore (SG)

(72) Inventor: Keng Leng Albert Lim, Singapore (SG)

(73) Assignee: CERTIS CISCO SECURITY PTE LTD, Singapore (SG)

( * ) Notice: Subject to any disclaimer, the term of this patent is extended or adjusted under 35 U.S.C. 154(b) by 0 days.

(21) Appl. No.: 18/720,715

(22) PCT Filed: Nov. 15, 2023

(86) PCT No.: PCT/SG2023/050765
§ 371 (c)(1),
(2) Date: Jun. 17, 2024

(51) Int. Cl.
*G06V 20/52* (2022.01)
*G06V 10/764* (2022.01)
*G06V 10/82* (2022.01)
*G06V 20/40* (2022.01)

(52) U.S. Cl.
CPC .......... *G06V 20/52* (2022.01); *G06V 10/764* (2022.01); *G06V 10/82* (2022.01); *G06V 20/41* (2022.01)

(58) Field of Classification Search
CPC ........ G06V 20/52; G06V 10/82; G06V 20/41; G06V 10/764
USPC ........................................................ 382/156
See application file for complete search history.

(56) References Cited

U.S. PATENT DOCUMENTS

| | | | |
|---|---|---|---|
| 2016/0071024 A1* | 3/2016 | Amer | G06F 18/29 706/12 |
| 2019/0243872 A1* | 8/2019 | Komatsu | G06F 18/22 |
| 2019/0338792 A1 | 11/2019 | Hayashi et al. | |
| 2020/0364868 A1* | 11/2020 | Zhang | G06T 7/248 |
| 2021/0224610 A1* | 7/2021 | Jha | G06N 3/045 |
| 2022/0246167 A1* | 8/2022 | Vaidya | G10L 25/78 |
| 2023/0334852 A1* | 10/2023 | Wang | A01B 79/005 |
| 2024/0095308 A1* | 3/2024 | Thomas | G06F 18/2415 |
| 2024/0169701 A1* | 5/2024 | Kulal | G06T 7/70 |
| 2024/0376813 A1* | 11/2024 | Sharma | E21B 47/008 |

FOREIGN PATENT DOCUMENTS

| | | |
|---|---|---|
| CN | 113591702 A | 11/2021 |
| WO | 2023288186 A1 | 1/2023 |

OTHER PUBLICATIONS

International Search Report and Written Opinion for PCT/SG2023/050765 mailed Jun. 4, 2024.

(Continued)

*Primary Examiner* — Kenny A Cese
(74) *Attorney, Agent, or Firm* — Barnes & Thornburg LLP

(57) ABSTRACT

This document describes a method for identifying anomaly constructs in real-time based on multimodal surveillance data, the identification being done using a multimodal sensory and cognitive abstraction module. Meta-descriptors are generated for the surveillance data and subsequently, meta-descriptor embeddings are generated for the meta-descriptors whereby the meta-descriptor embeddings are used by an anomaly assertion model to detect anomaly constructs within the surveillance data.

21 Claims, 4 Drawing Sheets

(56) References Cited

OTHER PUBLICATIONS

Conradi Hoffmann, J.L. et al., Anomaly Detection on Wind Turbines Based on a Deep Learning Analysis of Vibration Signals. Applied Artificial Intelligence, Aug. 25, 2021, vol. 35, No. 12, pp. 893-913.

* cited by examiner

SYSTEM AND METHOD FOR DISCOVERING ANOMALOUS CONSTRUCT VIA COGNITIVE ABSTRACTION IN A MULTIMODAL SENSORY FUSION ECOSYSTEM

CROSS REFERENCE TO RELATED APPLICATIONS

This application is a National Stage application of International Application No. PCT/SG2023/050765 filed Nov. 15, 2023, the content of which is incorporated herein by reference in its entirety.

TECHNICAL FIELD

This application relates to a method for identifying anomalous construct in real-time based on multimodal surveillance data, where the identification is being done using a cognitive abstraction module within a multimodal sensory integration ecosystem. Meta-descriptors are generated for the multimodal surveillance data and subsequently, meta-descriptor embeddings are generated for the meta-descriptors using a plurality of algorithmic strategies whereby anomalous constructs can be discovered within the continuous stream of multimodal surveillance data.

BACKGROUND

Surveillance systems tasked with monitoring an excessive number of surveillance data streams comprising video, audio, temperature, olfactory, barometric and etc. encounter a myriad of challenges. One prominent issue lies in the sheer amount of manpower required to oversee the vast array of panels, screens and optical mechanisms emanating from these feeds. The need for human operators to continuously observe and analyze each data stream manifestations places enormous demands on human operators. Additionally, the operators are also susceptible to human error and fatigue especially over long periods of operational time. Consequently, maintaining a fully staffed command center to handle the sheer volume of information becomes impractical and costly. Moreover, the overwhelming volume of data can lead to information overload, making it exceedingly challenging to promptly identify and respond to critical events.

To address the challenges faced by surveillance systems dealing with a high volume and variety of surveillance feeds, those skilled in the art have proposed various methods to address these problems. One of the methods proposed is to utilize analytical systems to perform real-time analysis on the surveillance feeds and to carry out off boundary escalation. In such systems, data streams from audio sensors, temperature sensors, olfactory, barometric sensors and video streams will be continuously collected and monitored. Triggers or alerts will then be generated based on predefined rules or thresholds when specific events or patterns are detected in the collected data. For example, in the area of digital video surveillance, it has been proposed that video analytical software be used to carry out real-time object recognition, tracking and behavioral analysis. The aim of such software would be to filter out non-critical events and to present only significant alerts to operators. Such software could be similarly adopted to analyze surveillance data comprising audio, temperature, olfactory or barometric measurements. However, such systems face a data integration and compatibility issue as data obtained from various sources would each be in their own format and structure. Additionally, setting appropriate thresholds and predefined criteria for anomaly assertion can be challenging as it requires a deep understanding of the system, and incorrect configurations can lead to false positives or missed anomalies.

Another approach proposed by those skilled in the art is to develop alert systems that prioritize alerts based on the perceived importance of an event whereby critical incidents should receive immediate attention, while lower-priority events can be queued for review. Yet another approach proposed by those skilled in the art is to simply utilize multiple panels or screen displays and video walls to consolidate surveillance feeds from different sources onto a smaller number of screens making it more manageable for operators to monitor multiple feeds simultaneously.

While the solutions mentioned offer valuable improvements for surveillance systems grappling with an overwhelming number of data streams, it should be noted that most of these solutions are fundamentally rule-based approaches. The methods and systems proposed above all rely on predefined criteria and if-then-else conditions. Such an approach has its limitations because it is inherently reactive rather than proactive. In other words, rule-based systems can only identify events that match predefined patterns or conditions and may miss new or unexpected incidents that have never occurred before. Moreover, adapting these rules to evolving situations and complex scenarios can be a challenging and resource-intensive task. Hence, those skilled in the art are constantly looking for more sophisticated, adaptive, and self-learning systems that can go beyond rule-based approaches to effectively address the complexities of modern security and monitoring challenges.

SUMMARY

The present disclosure revolutionizes surveillance technology by employing machine learning techniques to autonomously handle routine contemporary physical security incidents. The primary objective is to diminish human involvement by empowering machines to effectively address known scenarios or events, thereby decreasing the necessity for continuous human oversight. The system is structured to operate independently, thereby enabling the system to manage routine or familiar incidents without the constant need for human supervision.

In an aspect of the present disclosure, a method for obtaining anomalous constructs from multimodal Binary Large Objects (BLOBs) of surveillance data using a cognitive abstraction module is disclosed. The disclosed the method comprises the steps of receiving the multimodal BLOBs of surveillance data, generating meta-descriptors for each of the multimodal BLOBs of surveillance data, generating a cumulative frequency distribution of all the generated meta-descriptors, generating meta-descriptor embeddings for each of the generated meta-descriptors, and identifying, using an anomaly assertion model, anomalous constructs from the generated meta-descriptor embeddings, and validating the anomalous constructs by asserting the anomalous constructs against the cumulative frequency distribution of all the generated meta-descriptors.

In another aspect of the present disclosure, a system for obtaining anomalous constructs from multimodal Binary Large Objects (BLOBs) of surveillance data is disclosed. The disclosed system comprises a computer processor; and a non-transitory media readable by the processing unit, the media storing instructions that when executed by the processing unit, causes the processing unit to: receive the multimodal BLOBs of surveillance data; generate meta-descriptors for each of the multimodal BLOBs of surveillance data; generate a cumulative frequency distribution of all the generated meta-descriptors; generate meta-descriptor embeddings for each of the generated meta-descriptors; and identify, using an anomaly assertion model, anomalous constructs from the generated meta-descriptor embeddings, and validating the anomalous constructs by asserting the anomalous constructs against the cumulative frequency distribution of all the generated meta-descriptors.

BRIEF DESCRIPTION OF THE DRAWINGS

Various embodiments of the present disclosure are described below with reference to the following drawings.

DETAILED DESCRIPTION

Figure 1:
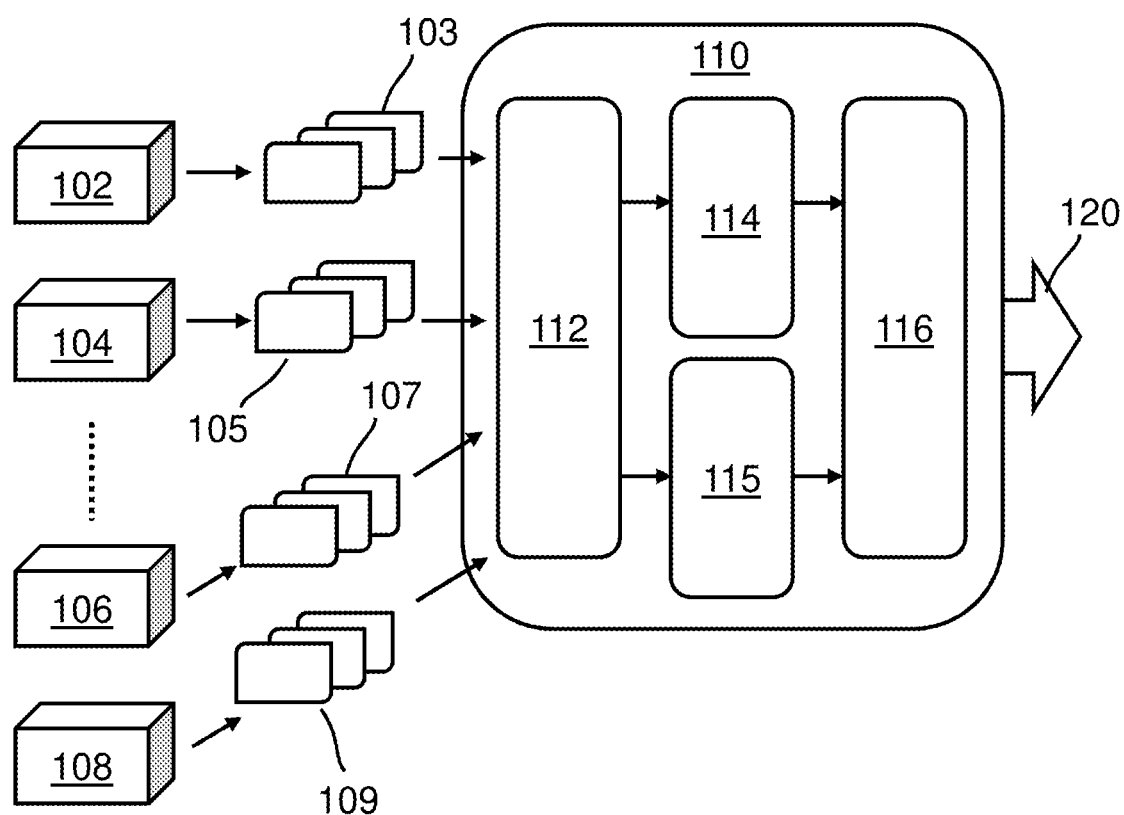
FIG. 1 illustrates a block diagram of a cognitive abstraction module for identifying anomaly constructs from surveillance data in real-time in accordance with embodiments of the present disclosure.

The following detailed description is made with reference to the accompanying drawings, showing details and embodiments of the present disclosure for the purposes of illustration. Features that are described in the context of an embodiment may correspondingly be applicable to the same or similar features in the other embodiments, even if not explicitly described in these other embodiments. Additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance as generally understood in the relevant technical field, e.g., within 10% of the specified value.

As used herein, the term "and/or" includes any and all combinations of one or more of the associated listed items.

As used herein, "comprising" means including, but not limited to, whatever follows the word "comprising". Thus, use of the term "comprising" indicates that the listed elements are required or mandatory, but that other elements are optional and may or may not be present.

As used herein, "consisting of" means including, and limited to, whatever follows the phrase "consisting of". Thus, use of the phrase "consisting of" indicates that the listed elements are required or mandatory, and that no other elements may be present.

As used herein, a "meta-descriptor" means, including, but not limited to, a series of alphanumeric characters that is used to describe or characterize an object, document, image, data file, audio recording or any type of digital file that may be processed by a computing device.

Further, one skilled in the art will recognize that certain functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the disclosure, a module may also comprise computer instructions or executable code that may instruct a computer processor to carry out a sequence of events based on instructions received. The choice of the implementation of the modules is left as a design choice to a person skilled in the art and does not limit the scope of the claimed subject matter in any way.

Further, one skilled in the art will also recognize that the detailed workings, internal structures, techniques and training datasets of machine learning models, neural networks and anomaly assertion models referred to in this disclosure have not been disclosed or shown in detail as such information is known to one skilled in the art and as such, has been omitted for brevity.

A command center designed for real-time monitoring of a wide spectrum of information will continuously receive a constant stream of surveillance data encompassing Binary Large Objects (BLOBs), where BLOBs may comprise videos, audio, temperature measurements, pressure measurements, olfactory measurement, images, text data and/or non-text data from numerous data sources. In embodiments of the disclosure, the video data may be obtained using image capturing devices such as surveillance cameras which are configured to capture and record live video feeds; the audio data may be obtained using audio capturing devices such as microphones and audio sensors configured to capture live audio fees, audio recordings or ambient sound data; the temperature/pressure data may be obtained by measurement devices such as temperature or pressure sensors configured to provide real-time temperature/pressure readings; and the text data may be obtained from various sources such as reports or incident logs, text messages and/or emails.

In particular, the video streams offer a visual perspective on monitored areas, while audio feeds provide auditory cues and context. In embodiments of the disclosure, the audio feeds may be digitally embedded within the video streams such that each of the BLOBs contain the same timestamps. Simultaneously, temperature and pressure sensors deliver crucial environmental data, ensuring the safety and functionality of monitored systems. Additionally, text data sources offer insights and reports relevant to the surveillance area. The command center's robust configuration enables seamless integration and analysis of all these data streams, providing an all-encompassing view of the monitored ecosystem to ensure that any potential anomalies or irregularities do not go unnoticed.

When existing surveillance systems detect an anomaly, it promptly triggers alerts and notifications, alerting the command center operators. The operators may then take immediate action to verify the event's significance and activate the appropriate response protocol. This response could involve notifying relevant authorities, deploying security personnel, or initiating an automated system response, depending on the nature and severity of the detected anomaly. The command center serves as the central nervous system of the surveillance network, ensuring rapid and efficient reactions to deviations from the expected norm, safeguarding the integrity and security of the monitored area, and responding effectively to evolving situations.

FIG. 1 illustrates a block diagram of a cognitive abstraction module for identifying anomalous constructs from surveillance data in real-time in accordance with embodiments of the present disclosure. In embodiments of the disclosure, cognitive abstraction module 110 may be provided as a precursor or a preliminary stage to a command center, whereby BLOBs of multimodal surveillance data are initially received and processed by cognitive abstraction module 110 before the processed data are provided to the command center.

In embodiments of the disclosure, cognitive abstraction module 110 may be configured to identify anomalous constructs comprising of unusual patterns, structures, or combinations of elements based on received BLOBS of multimodal surveillance data. It should be understood that these anomalous constructs may not necessarily correspond to individual events in the BLOBS of surveillance data but may comprise unusual correlations of clusters of various types of surveillance data, or groupings of various types of surveillance data points.

In embodiments of the disclosure, an "anomalous construct" represents a paradigm shift in how surveillance data is interpreted. Instead of the conventional approach of merely identifying objects and quantifying their occurrences visual surveillance, the multimodal approach allows emphasis to be placed on grasping the broader context, interactions and an understanding of the actions taking place, and capturing the underlying situations, henceforth a construct, instead of an event without the context of the underlying situations.

This innovative approach prioritizes recognizing the subtext and context that define what is occurring within an image or video, transcending the mere mechanical output of simple answers, such as object counting. It delves deeper into the intricacies of the visual content, focusing on the relationships, interactions, and dynamics that transpire between objects and their environment.

In essence, an "anomalous construct" encompasses a more holistic understanding of the surveil situation and interaction of events depicted in the available data. It enables the machine to go beyond basic object recognition, embracing a profound comprehension of the visual content and the activities unfolding within. This shift in perspective holds particular significance in applications where the assertion of the detection of anomalies, unusual events, or complex activities is of paramount importance.

Therefore, it can be said that cognitive abstraction module 110 is configured to detect abnormal relationships or structures within the BLOBs of multimodal surveillance data, which may not manifest as isolated events but as deviations arising from various combinations of the multimodal surveillance data. In embodiments of the disclosure, cognitive abstraction module 110 may be provided in the cloud, at the command center and/or at a remote location a distance away from the command center and is configured to communicate through wireless or wired connection with the command center. In other embodiments of the disclosure, a cognitive abstraction system may comprise a plurality of cognitive abstraction modules 110 such that each of the modules are configured to handle its own BLOBs of multimodal surveillance data thereby allowing multiple BLOBs of multimodal surveillance data to be processed in parallel by each respective module 110 in the system.

Unlike processes adopted at existing command centers which analyzes multimodal surveillance data individually, cognitive abstraction module 110 is configured to simplify, generalize, and extract essential information from the diverse and complex data sources before providing this summarized information to a command center. The processes performed by cognitive abstraction module 110 involves the transformation of raw data from multiple modalities, such as video streams, image frames, audio segments, text segments, and measurement segments, into more manageable and understandable forms. Through the processing and analysis of the multimodal surveillance data, cognitive abstractions module 110 is able to establish a relationship between objects and elements in a scene and/or the activities taking place in the scene, is able to understand the role and purpose of objects and/or their interaction and behaviors.

In order to achieve the above, cognitive abstraction module 110 is configured to continuously monitor and receive BLOBs of multimodal surveillance data transmitted to module 110 from a variety of sources. The BLOBs of multimodal surveillance data may include, but are not limited to, a series of image frames 103 obtained from image capturing device 102, a series of audio segments 105 obtained from audio capturing device 104, a series of measurements 107 obtained from measurement device 106 and a series of text segments 109 obtained from computing module 108. Through the processing of the BLOBs of surveillance data from multiple modalities, cognitive abstraction module 110 provides information and data to a command center so that human operators at the command center may have a more comprehensive view of a monitored area or system therefore allowing the human operators to obtain a more holistic understanding of the ongoing activities.

From FIG. 1, it can be seen that cognitive abstraction module 110 comprises meta-descriptor generator module 112, meta-descriptor embedding module 114, frequency distribution module 115 and anomaly assertion module 116. Meta-descriptor generator module 112 is configured to receive and store the BLOBs of multimodal surveillance data (image frames 103, audio segments 105, measurements 107, text segments 109 and/or any type of digital data) from the various sources and to generate meta-descriptors for each of the different types of surveillance data, as long as the surveillance data is in a digital format. The meta-descriptors are then provided to meta-descriptor embedding module 114 and frequency distribution module 115.

In embodiments of the disclosure, a meta-descriptor database (not shown) may be configured to receive and store meta-descriptors generated by various other technological means, and may comprise, but are not limited to, software modules or hardware modules configured to generate meta-descriptors from various types of digital data. Meta-descriptor database may comprise a server, a computing device, a cloud server, a remote database, or any other similar storage device, and may be located either in close proximity with cognitive abstractions module 110 or may be located in a remote location. The meta-descriptor database may then be configured to communicate the received and/or stored meta-descriptors to cognitive abstraction module 110 for further processing as set out in the following sections.

Meta-descriptor embedding module 114 is configured to create meta-descriptor embeddings for each of the generated meta-descriptors. In embodiments of the disclosure, these meta-descriptor embeddings may comprise, but are not limited to, dense vector representations of the meta-descriptors, where meta-descriptors are processed based on their semantic meaning rather than just their individual words and/or terms. It should be noted that a dense vector comprises a vector that primarily contains non-zero values and is used to represent numerical data in a compact form. In the context above, dense vectors often comprise high-dimensional representations of the meta-descriptors where each dimension of the dense vectors corresponds to a feature or attribute of the meta-descriptor. These dense vectors capture complex relationships and semantic information within the meta-descriptors, enabling anomaly assertion module 116 to work effectively with the data. For example, a dense vector could be used to represent various features of a meta-descriptor whereby each element has a weight assigned to a particular term or concept. When the dense vectors are combined together, this collection of dense vectors could form part of a more complex model, such as a word embedding model, where each element in the dense vector might correspond to specific linguistic attributes such as context, semantics, or syntactic information. One skilled in the art will recognize that the meta-descriptor embeddings may comprise other types of vector representations of the meta-descriptors and are not limited to the embodiment described above.

Figure 4:
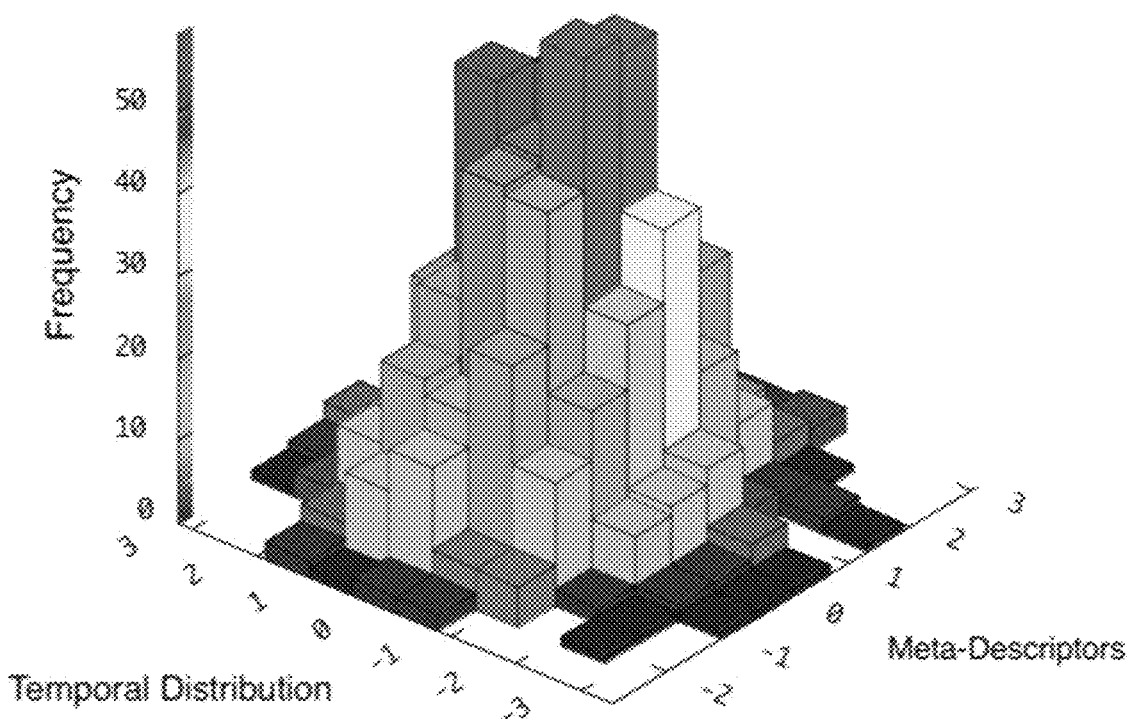
FIG. 4 illustrates a plot of a cumulative frequency distribution that bins the meta-descriptors based on their occurrence along with their temporal distribution.

Concurrently, frequency distribution module 115 is configured to continuously generate a cumulative frequency distribution of all the meta-descriptors generated by meta-descriptor module 112. In embodiments of the disclosure, the cumulative frequency distribution may be generated using cumulative frequency distribution techniques that bin the meta-descriptors based on the frequency of occurrence of the meta-descriptors. In another embodiment of the disclosure, frequency distribution module 115 may be configured to generate cumulative frequency distributions of the meta-descriptors along with their temporal distributions using cumulative frequency distribution techniques that bins the meta-descriptors based on their occurrence along with their temporal distribution. Such an embodiment is illustrated in FIG. 4. The time intervals may be defined in hours, minutes, or seconds, depending on the granularity of the timestamps of the meta-descriptors. It should be noted that the cumulative frequency distribution is generated over a large time frame, e.g., days, weeks, months, and is dependent on the scene or area that is being monitored. The cumulative frequency distribution of all the meta-descriptors may then be provided to anomaly assertion module 116.

Anomaly assertion module 116 then identifies anomalous constructs based on the received meta-descriptor embeddings for each of the meta-descriptors from meta-descriptor embedding module 114 for each time interval whereby each time interval may be defined in minutes or hours. Subsequently, anomaly assertion module 116 then determines based on the anomalous constructs and the cumulative frequency distribution of all the meta-descriptors if the identified anomalous constructs are true anomalies or false positives. It is useful to note that the cumulative frequency distribution of all the meta-descriptors generated over a longer timeframe (days, weeks, months) have a higher weightage as compared to the shorter timeframe (minutes, hours) of the anomaly assertion module. Hence, when the anomalous constructs generated by anomaly assertion module 116 are overlaid contrastively with the cumulative frequency distribution of all the meta-descriptors, this provides an insight as to whether the anomalous construct is truly anomalous or a false positive-thereby validating the anomalous construct. In embodiments of the disclosure, the anomalous constructs may be validated by asserting the anomalous constructs against a cumulative frequency distribution and this may include the step of assessing how these anomalous constructs fit within the overall distribution of data or occurrences to determine if these anomalous constructs deviate significantly from the expected or typical patterns represented by the cumulative frequency distribution.

It is useful to note that anomalous assertion module 116 performs a function beyond that of anomaly detection. After unusual patterns or data points that deviate from expected behavior are detected, anomalous assertion module 116 verifies if these detected anomalies are genuine based on the continuous frequency distribution as obtained from frequency distribution module 115. The anomaly assertion, in terms of the population, finalizes the validation of the identified anomalies, determining their certainty. This procedure assists in distinguishing between authentic anomalies that may signal potential problems or security risks and incorrect alerts, which are simply normal fluctuations or harmless irregularities. Anomaly assertions streamline the laborious and disruptive human validation process when dealing with genuine anomalies, ultimately enhancing the precision and efficiency of anomaly detection systems.

Once this is done, surveillance data, which may comprise videos, audio, temperature measurements, pressure measurements, olfactory measurements, images, text data and/or non-text data, associated with these validated anomalous constructs are then tagged and/or highlighted by anomaly assertion module 116. The validated anomalous constructs along with their associated surveillance data may then be provided as a data file 120 to trigger notifications or an application programming interface (API) to the command center's existing monitoring technology or apparatus, thereby allowing the human operators at the command center to perform more rapid automated incident triage with precision accordingly without the need to spend unproductive time watching live data feed on screens and panels.

In embodiments of the disclosure, results obtained based on remediation actions triggered or taken by human operators against the received anomalous constructs will be subsequently fed back to anomaly assertion model 116 through API calls to allow continuous self-learning of the model and thereby improve the accuracy rate of future anomalous constructs assertion. In particular, anomaly assertion model 116 may undergo a reinforcement learning process whereby the results of the remediation actions triggered or taken are used to allow continuous improvement of the accuracy of the anomaly assertion model 116. In embodiments of the disclosure, this may also be done by retraining the model based on the received results.

It is advantageous to utilize cognitive abstraction module 110 as described above as meta-descriptors associated with various types of surveillance data are a valuable source of information that enriches raw surveillance data stored in a data lake. Unlike raw data, which often comprises a continuous stream of various types of surveillance data, the meta-descriptors may provide ambient context, enabling a deeper understanding of specific moments captured in the surveillance data offering insights into each BLOB captured by the surveillance data, helping to identify anomalies and facilitate event description.

Moreover, the meta-descriptors aid in the organization and categorizing of relevant data, offering descriptions, tags, and labels for each frame and/or segment of the surveillance data. This enhances the search and retrieval efficiency of module 110 thereby improving incident response, forensic analysis, and data management within the realm of surveillance.

In embodiments of the disclosure, image capturing device 102 may be configured to capture and record live video feeds. These video feeds may be in various formats such as MP4, MKV, MOV, AVI and etc. The video feeds may then be converted into a series of image frames 103 using video processing software and may be in formats such as JPEG, TIFF, BMP, PNG, etc. During the generation of image frames 103, metadata containing spatial-temporal information (e.g., timestamp or location indicator) of the generated image may be obtained from the video feeds and embedded into each of image frames 103. The video feeds and/or the series of image frames 103 are then communicated to cognitive abstraction module 110 for further processing.

In embodiments of the disclosure, audio capturing device 104 may be configured to capture and record live audio feeds. These audio feeds may be in various formats such as MP3, WAV, AAC and etc. Audio capturing device 104 may then convert the audio feeds into a series of audio segments using audio processing software whereby each audio segment comprises a predetermined period of an audio signal. Similar to the processing of the image frames, during the generation of audio segments 105, metadata containing spatial-temporal information (e.g., timestamp or location indicator) of the generated audio segments may be obtained from the audio feeds and embedded into each of audio segments 105. The series of audio feeds and/or the series of audio segments 105 are then communicated to cognitive abstraction module 110 for further processing. In embodiments of the disclosure, image and audio capturing device 102 and 104 may be combined to generate image frames 103 that are embedded with audio signals 105. The series image frames with the embedded audio signals (together with the embedded metadata) may then be communicated to cognitive abstraction module 110.

In embodiments of the invention, measurement device 106 may comprise various types of sensors that are configured to capture various measurements such as temperature, olfactory and/or pressure readings. The captured measurements may be stored in a digital format and may be embedded with metadata containing spatial-temporal information, specific environmental conditions or events associated with the measurements. Measurement device 106 may then convert the measurements into a series of measurements 107 based on the information contained within the metadata. The metadata may also similarly be embedded into the series of measurements 107 before it is communicated to cognitive abstraction module 110.

In embodiments of the invention, computing module 108 may comprise a computing device configured to utilize application programming interfaces (APIs) to retrieve text data from messages, emails, structured and unstructured data and etc. Computing module 108 may pre-process the text data by removing irrelevant characters and by converting the text into a standardized format. The text may then subsequently be segmented and embedded with metadata containing spatial-temporal information about the segmented text. Series of text segments 109 with the embedded metadata is then communicated to cognitive abstraction module 110.

Meta-descriptor generator module 112 then receives the multimodal surveillance data from the various sources and generates meta-descriptors for each of the different types of surveillance data. It should be noted that the meta-descriptors are generated concurrently for each of the different BLOBs of surveillance data (i.e., the different types of surveillance data) and the timestamps of each of the BLOBs are embedded into each of the meta-descriptors so that when the meta-descriptors are processed by anomaly assertion module 116, module 116 will be able to establish a correlation between the various meta-descriptors.

In embodiments of the disclosure, when the surveillance data comprises a sequence or a series of image frames that are in the form of BLOBs, meta-descriptor generator module 112 may randomly select BLOBs from the series of BLOBs and may then proceed to generate a meta-descriptor for each of these randomly selected BLOBs. Meta-descriptor generator module 112 may comprise a generative artificial intelligence (AI) model, which comprises a deep learning neural network configured to generate meta-descriptors for image frames by processing the visual data. The generative AI model may comprise, but is not limited to, a generative transformer model, a universal image text representation model, an object-semantics alignment model or a contrastive learning model. The detailed workings of these models are omitted for brevity as they are known to one skilled in the art.

In embodiments of the disclosure, the generative AI may be configured to leverage complex machine learning models to create new data that closely resembles existing data it has been trained on. These models, often based on neural networks, learn patterns and structures within a large dataset during the training phase. Once trained, the generative AI model may then generate entirely new and original data samples.

For example, the generative AI model may be trained on a corpus of text documents, or on a dataset of images, and so on. During the training process, the generative AI model learns the underlying structures and patterns through the use of neural networks such as Recurrent Neural Networks (RNNs), Convolutional Neural Networks (CNNs), or more recently, Transformer-based models like GPT. Once the underlying model has been trained, the generative AI model can then generate new data that is similar to the training data. The generative model may be further tuned based on feedback from its outputs or based on automated metrices. The detailed workings of the generative AI model are omitted for brevity in this disclosure.

In embodiments of the disclosure, when the surveillance data comprises a sequence or a series of audio segments in the form of BLOBs, meta-descriptor generator module 112 may randomly select BLOBs from the series of BLOBs and may then proceed to generate a meta-descriptor for each of these randomly selected BLOBs. Meta-descriptor generator module 112 may comprise a speech recognition model to transcribe spoken content in the audio segment into text thereby forming a set of meta-descriptors for the audio segment and this transcribed text may be further processed using natural language models such as, but not limited to, a language transformer to form the set of meta-descriptors for the audio segment. The language transformer may be pre-trained based on large-detailed text corpora allowing the language transformer to capture contextual information, semantics and patterns from text provided to the language transformer. The detailed workings and training of these models are omitted for brevity as they are known to one skilled in the art.

In embodiments of the disclosure, when the surveillance data comprises a sequence or series of measurements, such as, but not limited to, temperature and pressure measurements, or a series of text segments in the form of BLOBs, meta-descriptor generator module 112 may randomly select BLOBs from the received series of BLOBs, before proceeding to generate a meta-descriptor for each of these randomly selected BLOBs. Meta-descriptor generator module 112 may utilize natural language models such as, but not limited to, a language transformer to generate the set of meta-descriptors for each of these randomly selected elements and the detailed workings and training of these models are omitted for brevity as they are known to one skilled in the art.

In embodiments of the disclosure, meta-descriptor generator module 112 may comprise any combination of meta-descriptor generation models and the type of model utilized by module 112 is dependent on the type of surveillance data received. It should be noted that it is not a requirement for the meta-descriptors to be in the form of coherent or structured subtexts, i.e., the meta-descriptors may include incoherent subtext. When the meta-descriptors are in the form of structured subtexts, these meta-descriptors would provide a level of awareness and insight to the information that is being communicated as it includes undertones that may be contained within an image or audio recording. Conversely, when the meta-descriptors are in the form of incoherent subtext, although the same level of awareness and insight may not be obtained from the images or audio recordings, the module would still be able to identify anomalous constructs from these incoherent subtexts based on the analysis performed on these meta-descriptors as set out in the subsequent sections.

Once meta-descriptors have been generated for each of the different types of surveillance data, the meta-descriptors are then provided to meta-descriptor embedding module 114 and frequency distribution module 115.

In embodiments of the disclosure, frequency distribution module 115 is configured to continuously generate a cumulative frequency distribution of all the meta-descriptors generated by meta-descriptor module 112 and the cumulative frequency distribution may be a one-dimensional frequency distribution or a two-dimensional frequency distribution, in which the temporal data of each of the meta-descriptors is utilized as well.

In embodiments of the disclosure, meta-descriptor embedding module 114 is configured to create meta-descriptor embeddings for each of the generated meta-descriptors. The generated meta-descriptors may be initially preprocessed through a tokenization process, a lowercasing process and/or a text preprocessing process. A language transformer may then be used to convert each of the meta-descriptors into dense vector representations whereby the dense vector representations represent the semantic information of the meta-descriptors. In embodiments of the disclosure, meta-descriptor embedding module 114 may be configured to generate meta-descriptor embeddings for various digital technologies that are capable of generating meta-descriptors of multimodal BLOBs. By assimilating the meta-descriptors from various technologies, meta-descriptor embedding module 114 is able to generate a holistic set of meta-descriptors embeddings for various types of multimodal BLOBs.

In embodiments of the disclosure, anomaly assertion module 116 comprises an anomaly assertion model that is configured to identify data points or patterns that deviate significantly from the "normal" or expected behavior of meta-descriptor embeddings. In operation, the model will collect and process data from various sources such as meta-descriptor embeddings that were generated from meta-descriptor generator module 112. Common techniques for anomaly assertion include statistical methods (e.g., Z-score), machine learning approaches (e.g., One-Class support vector machine), clustering methods (k-means clustering or local outlier factor models) or other deep learning methods (e.g., variational autoencoders). The detailed workings and training of these models are omitted for brevity as they are known to one skilled in the art.

In embodiments of the disclosure, anomaly assertion module 116 may comprise an unsupervised algorithm ensemble which combines multiple unsupervised clustering models, multiple statistical models, multiple deep learning models or combinations thereof to improve the quality and reliability of clustering results when the data sources comprise complex and diverse data patterns. Each algorithm within the ensemble may employ different techniques, initialization methods, or parameters, introducing diversity in the clustering process. The goal of the ensemble is to mitigate the limitations and biases of individual algorithms and to provide a more robust, stable, and accurate clustering solution. This ensemble approach often yields better results than any single algorithm alone as the collective decisions of multiple algorithms are simultaneously leveraged to produce the result. In embodiments of the disclosure, anomaly assertion module 116 may comprise of any combination of the following models, but are not limited to, One-Class Support Vector Machine, k-Nearest Neighbors, Support Vector Machine, Local Outlier Factor, Random Forest, Isolation Forest, Mahalanobis Distance-based model, Histogram-based Outlier Detection and/or Clustering-based Anomaly assertion.

The ensemble typically involves a two-step process: aggregation and consensus. In the aggregation step, individual algorithms are configured to generate their clustering results, predictions and/or scores (whereby the output is dependent on the type of algorithm used) which are then combined using techniques like voting, averaging, or probabilistic methods. In the consensus step, the ensemble seeks to find a common agreement or clustering structure among the aggregated results. This consensus clustering helps filter out noise, increase the stability of the clusters, and produce a more reliable final partition of the data. In embodiments of the disclosure, the scores, results and/or predictions obtained from the individual algorithms are obtained in stored in database. The information stored in this database may then be employed as a weighted average or a straightforward aggregation. For example, to determine if a meta-descriptor embedding comprises part of an anomalous construct, the results from various algorithms associated with the particular meta-descriptor embedding are analyzed through the utilization of a weighted voting or averaging technique.

In embodiments of the disclosure, the unsupervised algorithm ensemble may comprise a combination of a k-nearest neighbors (K-NN) model which focuses on classifying data points based on the majority class of their neighbors, a support vector machine (SVM) model which aims to find an optimal hyperplane for separating different classes, and a Random Forest model which uses a collection of data trees to carry out its predictions. The combination of these three models is advantageous as this combination enhances the accuracy and robustness of the anomaly assertion module. However, one skilled in the art will recognize that other types of machine learning models, classification models and/or grouping techniques may be utilized in the unsupervised algorithm ensemble and that the unsupervised algorithm ensemble is not limited to only the models and/or techniques mentioned in this disclosure.

In embodiments of the disclosure, the K-NN model may be configured to determine the class of a deep vector representation (as obtained from the meta-descriptor embeddings) based on the classes of its k-nearest neighbors in the feature space. A value for "K" is specified, where this value represents the number of nearest neighbors which are to be considered in the making of the classification decision and the choice of "K" impacts the algorithm's performance. The distance between data points in the feature space may be obtained based on the Euclidean distance metric which is defined as:

$$d(x,x') = \sqrt{((x_1-x'_1)^2 + \ldots + (x_n-x'_n)^2)} \quad (1)$$

where x and x' represent two data points in the feature space, and there are "n" number of data points in the feature space.

K-nearest neighbors, "A", having the smallest Euclidean distance to x is then selected. To determine the class for a datapoint x in the K-NN classification scenario, the classes of its K-nearest neighbors are evaluated. The datapoint x is then assigned to the class with the highest probability, which is calculated by tallying how many of the K-nearest neighbors belong to each class. This probability function may be defined as:

$$P(y=j \mid X=x) = \frac{1}{K} \sum_{i \in A} I(y^{(i)} = j) \quad (2)$$

where P(y=j|X=x) represents the probability of input x belonging to class j, K denotes the number of neighbors considered, and $I(v^{(i)}=j)$ is an indicator function verifying if the class of the $i^{th}$ neighbor matches class j.

In embodiments of the disclosure, an SVM model is used to find an optimal hyperplane to separate data into distinct classes. Given a set of "n" data points, "$x_n$", with corresponding class labels "$y_i$", where $x_i$ is defined as a feature vector in a high-dimensional space and where $y_i$ is defined as $y_i \in \{-1,1\}$ for binary classification, the hyperplane may be defined by the following equation:

$$w \cdot x + b = 0 \quad (3)$$

where w is defined as a weight factor and b is defined as a bias term. The objective of the SVM model would be to determine a value of w and b such that a margin $2/\|w\|$, which represents a perpendicular distance from the hyperplane to the nearest data points, while correctly classifying all data points according to their labels. This optimization problem can thus be expressed as:

$$\text{Minimize } \frac{1}{2}\|w\|^2 \text{ subject to } y_i(w \cdot x_i + b) \geq 1 \text{ for all data points } x_i$$

This optimization problem may then be solved using quadratic programming techniques where the data points that lie closest to the hyperplane and are involved in defining it are known as support vectors.

For the classification of the data points, given a new data point x, the SVM model will then determine the class of the new data point x by computing (w·x+b). If the result is greater than 0, the SVM model determines that the data point belongs to one class, and if it's less than 0, it belongs to the other class. This may be expressed as:

$$y \text{ pred} = \text{sign}(w \cdot x + b) \quad (4)$$

It should be noted that a SVM model's flexibility comes from the use of a kernel function ($K(x_i, x_j)$) to map the data points into a higher-dimensional space, which allows the SVM model to capture complex, nonlinear relationships and common kernel functions may include, but are not limited to, linear, polynomial, and radial basis function (RBF).

In embodiments of the disclosure, the Random Forest algorithm is method that combines the predictions of multiple decision trees to improve the overall accuracy and robustness of the model. It operates on a dataset containing "n" data points, each represented by a set of features. The algorithm creates a forest of decision trees through a process of bootstrapping and random feature selection. For each tree in the forest, a random subset of the data points is sampled with replacement from the original dataset, and a random subset of features is considered at each split. This introduces randomness and diversity into the individual trees, making them less prone to overfitting.

The decision trees in a Random Forest aim to make predictions by recursively partitioning the feature space. At each node of the tree, the algorithm selects the best feature (from the random subset) and split point that minimizes impurity. For a classification task, impurity can be measured using Gini impurity or entropy, and for regression tasks, it can be measured using mean squared error. The prediction from each tree is obtained by averaging (for regression) or voting (for classification) the outcomes of all the individual trees. Mathematically, this can be represented as:

For Classification:

$$Y\_\text{pred} = \text{mode}(Y\_\text{tree}\_1, Y\_\text{tree}\_2, \ldots, Y\_\text{tree}\_n) \quad (5)$$

For regression:

$$Y\_\text{pred} = (Y\_\text{tree}\_1 + Y\_\text{tree}\_2, \ldots, Y\_\text{tree}\_n) \quad (6)$$

where Y_tree_i represents the prediction made by the ith decision tree.

In embodiments of the disclosure, to ensure that the meta-descriptors embeddings are in a suitable format for each of the models mentioned above, the embeddings may be scaled and normalized. Each of the models is then applied to the embeddings individually to identify potential anomalies. The results obtained from each method are then combined using ensemble techniques (such as, but not limited to, bootstrapping, random forest, boosting, adaptive boosting, stacking and etc.) or voting systems to produce a unified anomaly score for each data point. By integrating these approaches in a concurrent manner (based on the embedded timestamps), the strengths of each model may be exploited while compensating for their individual weaknesses. This integrated framework allows for a more comprehensive and accurate identification of anomalies within the data, leading to a more effective anomaly assertion process.

After anomaly assertion module 116 has identified anomalous constructs based on the received meta-descriptor embeddings for each of the meta-descriptors from meta-descriptor embedding module 114, the unsupervised algorithm ensemble may utilize the cumulative frequency distribution from frequency distribution module 115 to validate the veracity of the identified anomalous constructs to determine if the identified anomalous constructs are true anomalies or false positives. It should be noted that anomaly assertion module 116 identifies anomalous constructs from the meta-descriptor embeddings over a predetermined time interval, e.g., hours, or minutes, while the cumulative frequency distribution comprises occurrences of meta-descriptors over a larger period, e.g., days, weeks, months. Hence, once anomaly assertion module 116 has identified anomalous constructs for a set of meta-descriptors (for a particular time interval), module 116 will then utilize the cumulative frequency distribution to assess if the identified anomalous constructs are indeed true anomalous assertions or false positives.

In an exemplary embodiment of the disclosure, when anomaly assertion module 116 determines that a group of meta-descriptors embeddings comprises an anomalous construct, module 116 will then retrieve the meta-descriptors related to this group of meta-descriptors embeddings. Module 116 then uses the cumulative frequency distribution to assess if the retrieved meta-descriptors are indeed true anomalous constructs or false positives. In embodiments of the disclosure, the retrieved meta-descriptors are determined to be false positives if it is determined from the cumulative frequency distribution that these meta-descriptors comprise part of an existing pattern (that can be seen from the historical data of the cumulative frequency distribution) or that these meta-descriptors repeatedly appear in the cumulative frequency distribution.

Once this is done, surveillance data associated with these identified anomalies are then classified as anomalous constructs by anomaly assertion module 116. The anomalous constructs may then be provided as a data file 120 to trigger notifications or an application programming interface (API) call to the command center operation technology, thereby allowing the human operators at the command center to perform faster automated triage accordingly. Results obtained based on remediation actions taken or triggered by human operators may undergo a reinforcement learning process to allow continuous improvement of the accuracy of the anomaly assertion model through API calls.

A summary of the algorithm for identifying anomaly constructs in real-time based on surveillance data in accordance with embodiments of the disclosure is summarized in Algorithm 1 below.

---

Algorithm 1: Cognitive Abstraction Algorithm

---

Data: Surveillance data (image frames, audio segments, measurements, text segments)
Result:
Surveillance data associated with anomalies.
Begin
1. Generate or assimilate sets of meta-descriptors for each of the BLOBS of the multimodal surveillance data.
2. Generate meta-descriptor embeddings for each of the meta-descriptors.
3. Continuously generate cumulative frequency distributions of all the meta-descriptors.
4. Identify anomalous constructs from the meta-descriptor embeddings.
5. Utilize the cumulative frequency distributions to assess if the meta-descriptors tagged as anomalous constructs are indeed true anomalous constructs or false positives.
End

---

Figure 2:
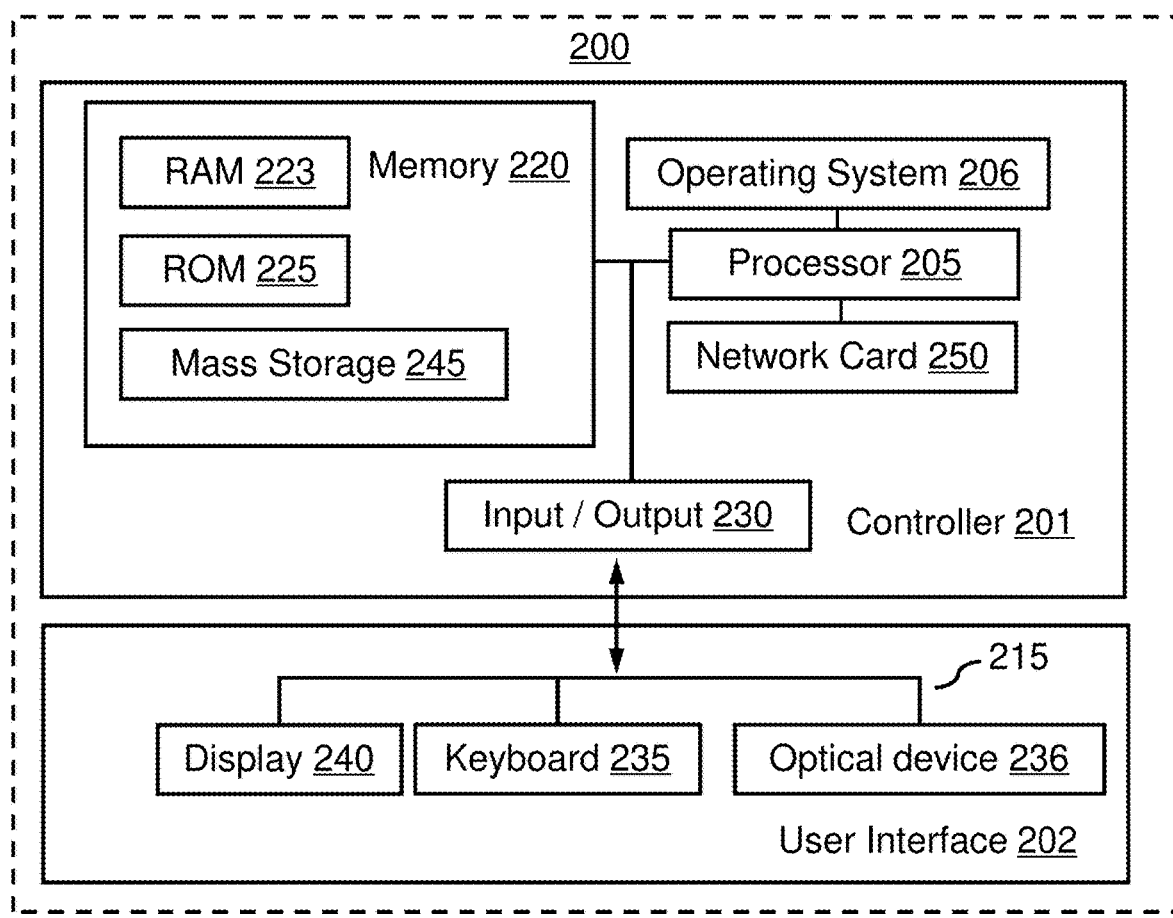
FIG. 2 illustrates a block diagram representative of a processing system for performing embodiments of the present disclosure.

In accordance with embodiments of the present disclosure, a block diagram representative of components of processing system 200 that may be provided within cognitive abstraction module 110 or any of the modules provided within cognitive abstractions module 110 to carry out any of the functions described above is illustrated in FIG. 2. One skilled in the art will recognize that the exact configuration of each processing system provided within these modules may be different and the exact configuration of processing system 200 may vary and the arrangement illustrated in FIG. 2 is provided by way of example only.

In embodiments of the invention, processing system 200 may comprise controller 201 and user interface 202. User interface 202 is arranged to enable manual interactions between a user and the computing module as required and for this purpose includes the input/output components required for the user to enter instructions to provide updates to each of these modules. A person skilled in the art will recognize that components of user interface 202 may vary from embodiment to embodiment but will typically include one or more of display 240, keyboard 235 and optical device 236.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from these modules via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 223, Read Only Memory (ROM) 225 and a mass storage device 245, the last comprising one or more solid-state drives (SSDs). One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming module such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU. In another example, it could be a cluster of CPU cores operating in parallel to accelerate computations.

Figure 3:
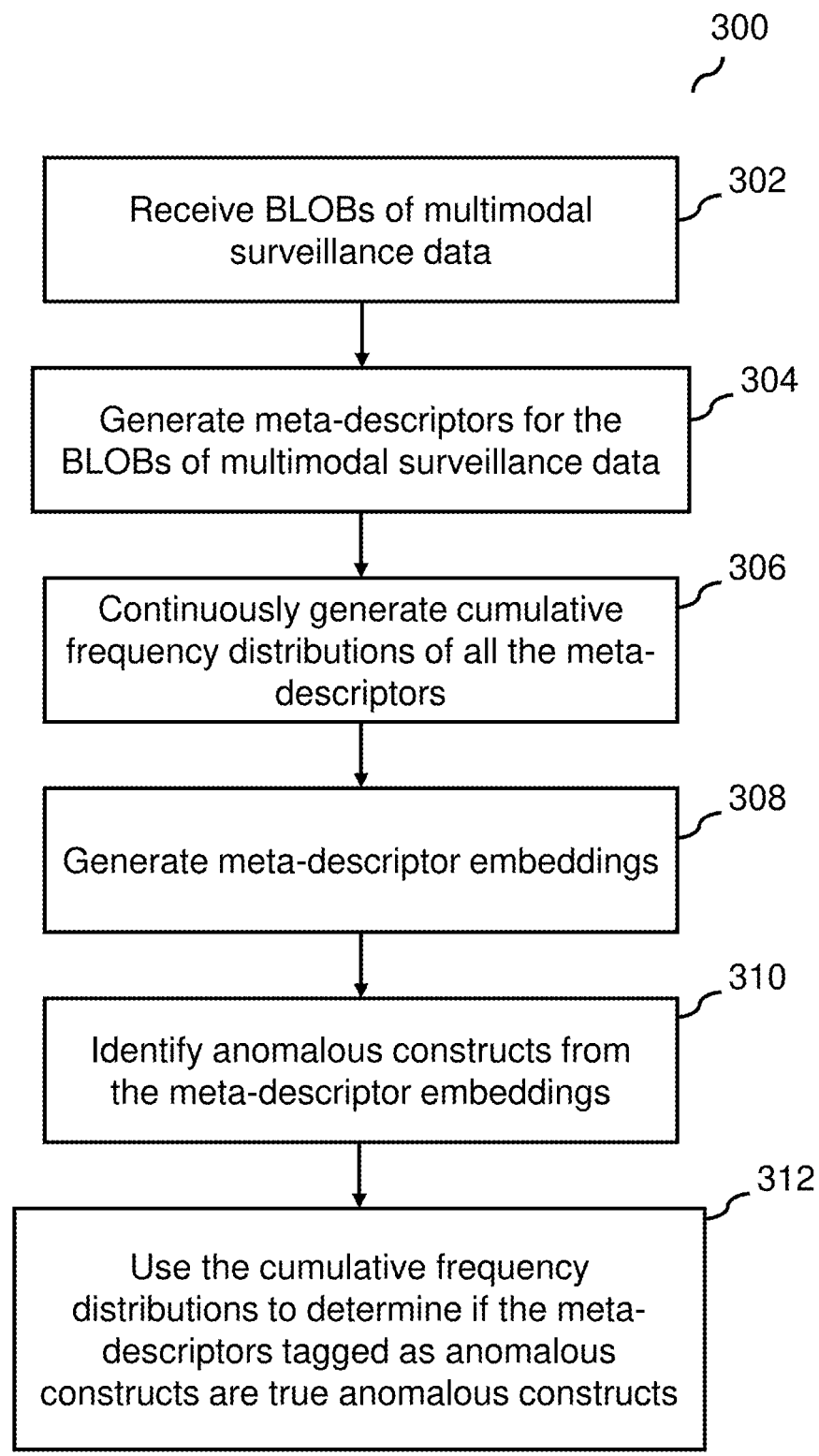
FIG. 3 illustrates a flowchart of a process for identifying anomaly constructs in real-time based on surveillance data in accordance with embodiments of the present disclosure.

A process for identifying anomaly constructs in real-time based on surveillance data is illustrated in FIG. 3 whereby process 300 may be carried out by a cognitive abstraction module in accordance with embodiments of the disclosure.

Process 300 begins at step 302 with the cognitive abstraction module receiving BLOBs of multimodal surveillance data from a plurality of surveillance sources whereby the received BLOBs of multimodal surveillance data may comprise a sequence of image frames, a sequence of audio segments, a sequence of measurements and/or a sequence of text.

At step 304, process 300 then generates meta-descriptors for each of the BLOBs of multimodal surveillance data, i.e., for each of the image frames in the sequence of image frames, each of the audio segments in the sequence of audio segments, each of the text segments in the sequence of text segments and/or each of the measurements in the sequence of measurements and/or any types of digital surveillance data. In certain embodiments, the BLOBs may be selected either randomly or according to a predetermined sequence from all of the BLOBs of received multimodal surveillance data. For this embodiment, process 300 will then only generate meta-descriptors for each of the BLOBs in this series of selected BLOBs.

In embodiments of the disclosure, process 300 may generate meta-descriptors for any BLOBs of digital data received by process 300 and this will take place at step 304. Additionally, it should be noted that process 300 may utilize various methods and techniques to generate the meta-descriptors of the BLOBs and these methods are not limited to the techniques mentioned in this disclosure.

Process 300 then continuously generates cumulative frequency distributions of all the meta-descriptors at step 306. At step 308, process 300 then proceeds to generate meta-descriptor embeddings for each of the meta-descriptors. Process 300 will then identify anomalous constructs from the generated meta-descriptor embeddings at step 310. Process 300 then utilizes the cumulative frequency distributions generated at step 306 to determine if the meta-descriptors tagged as anomalous constructs are true anomalous constructs or if they are false positives. The true anomalous constructs along with their tagged meta-descriptor and/or corresponding multimodal surveillance data may then be provided by process 300 as a data file to trigger notifications or an application programming interface (API) to the command center, thereby allowing the human operators at the command center to perform triage accordingly. In embodiments of the disclosure, process 300 may receive post asserted triggers by human operators at the command center, whereby this information is used by process 300 to retrain the anomaly assertion model to improve the accuracy of the model.

In embodiments of the disclosure, process 300 may classify surveillance data associated with the validated anomalous constructs as anomalous surveillance data.

In embodiments of the disclosure, process 300 may further provide the anomalous surveillance data and the validated anomalous constructs associated with the anomalous surveillance data to a command center and upon receiving, from the command center, results obtained based on remediation actions taken against the anomalous surveillance data and the validated anomalous constructs, process 300 may then utilize these received results to fine-tune the anomaly assertion model.

In embodiments of the disclosure, when at least one of the multimodal BLOBs of surveillance data comprises a sequence of image frames, the step of generating the meta-descriptors for the at least one of the multimodal BLOBs of surveillance data comprises process 300 generating meta-descriptors for each of the image frames in the sequence of image frames using a generative artificial intelligence model.

In embodiments of the disclosure, the step of generating meta-descriptors for each of the image frames comprises process 300 randomly selecting image frames from the series of image frames and generating meta-descriptors for each of the randomly selected image frames.

In embodiments of the disclosure, the generative artificial intelligence model may comprise a generative transformer model, a universal image text representation model, an object-semantics alignment model or a contrastive learning model.

In embodiments of the disclosure, the anomaly assertion model may comprise an unsupervised algorithm ensemble.

In embodiments of the disclosure, the unsupervised algorithm ensemble may comprise a combination of an unsupervised clustering model, a statistical model and a deep learning model.

In embodiments of the disclosure, the unsupervised algorithm ensemble may be configured by process 300 to utilize ensemble techniques to identify anomalous constructs from outputs of the unsupervised clustering model, the statistical model, and the deep learning model.

In embodiments of the disclosure, the sequence of image frames may comprise image frames obtained from a video data file.

In embodiments of the disclosure, when at least one of the multimodal BLOBs of surveillance data further comprises a sequence of audio segments, process 300 may then generate meta-descriptors for each of the audio segments in the sequence of audio segments using an alphanumeric character generation model.

In embodiments of the disclosure, when at least one of the multimodal BLOBs of surveillance data further comprises a sequence of measurements, process 300 may then generate meta-descriptors for each of the measurements using an alphanumeric character generation model.

In embodiments of the disclosure, the cumulative frequency distribution of all the generated meta-descriptors may comprise occurrences of the meta-descriptors along with temporal distributions of each of the meta-descriptors.

In embodiments of the disclosure, anomalous constructs from a plurality of streams of multimodal Binary Large Objects (BLOBs) of surveillance data may be obtained by process 300 using a system comprising a plurality of cognitive abstraction modules, whereby each cognitive abstraction module is configured to receive one of the plurality of streams of multimodal BLOBs of surveillance data, and whereby each cognitive abstraction module in the system is configured to perform the processes performed by process 300.

Numerous other changes, substitutions, variations, and modifications may be ascertained by the skilled in the art and it is intended that the present application encompass all such changes, substitutions, variations, and modifications as falling within the scope of the appended claims.

The invention claimed is:

1. A method for obtaining anomalous constructs from multimodal Binary Large Objects (BLOBs) of surveillance data using a cognitive abstraction module, the method comprising:

receiving the multimodal BLOBs of surveillance data concurrently, wherein the multimodal BLOBS of data surveillance data comprise a sequence of image frames, a sequence of audio segments, and a sequence of measurements over a first time interval and a second time interval;

generating meta-descriptors for each of the multimodal BLOBs of surveillance data obtained over the first and second time intervals, wherein the meta-descriptors comprise alphanumeric characters that characterize a corresponding multimodal BLOB of surveillance data;

generating a cumulative frequency distribution of all the generated meta-descriptors obtained over the second time interval;

generating meta-descriptor embeddings for each of the generated meta-descriptors; and identifying, using an anomaly assertion model, multimodal anomalous constructs from all the generated meta-descriptor embeddings, and validating the multimodal anomalous constructs by asserting the multimodal anomalous constructs obtained over the first time interval against the cumulative frequency distribution of all the generated meta-descriptors obtained over the second time interval, wherein the second time interval comprises two or more multiples of the first time interval.

2. The method according to claim 1, whereby when at least one of the multimodal BLOBs of surveillance data comprises the sequence of image frames, the step of generating the meta-descriptors for the at least one of the multimodal BLOBs of surveillance data comprises the step of generating meta-descriptors for each of the image frames in the sequence of image frames using a generative artificial intelligence model.

3. The method according to claim 2, whereby the step of generating meta-descriptors for each of the image frames comprises the steps of:

randomly selecting image frames from the series of image frames in each discrete time model; and generating meta-descriptors for each of the randomly selected image frames.

4. The method according to claim 2, wherein the generative artificial intelligence model comprises a generative transformer model, a universal image text representation model, an object-semantics alignment model or a contrastive learning model.

5. The method according to claim 1, wherein the anomaly assertion model comprises an unsupervised algorithm ensemble.

6. The method according to claim 5, wherein the unsupervised algorithm ensemble comprises a combination of an unsupervised clustering model, a statistical model and a deep learning model.

7. The method according to claim 2, wherein the sequence of image frames comprises image frames obtained from a video data file.

8. The method according to claim 2, whereby when at least one of the multimodal BLOBs of surveillance data further comprises the sequence of audio segments, the step of generating the meta-descriptors for the at least one of the multimodal BLOBs of surveillance data comprises the step of generating meta-descriptors for each of the audio segments in the sequence of audio segments using an alphanumeric character generation model.

9. The method according to claim 2, whereby when at least one of the multimodal BLOBs of surveillance data further comprises the sequence of measurements, the step of generating the meta-descriptors for the at least one of the multimodal BLOBs of surveillance data comprises the step of generating meta-descriptors for each of the measurements using an alphanumeric character generation model.

10. The method according to claim 1, wherein the cumulative frequency distribution of all the generated meta-descriptors comprises occurrences of the meta-descriptors along with temporal distributions of each of the meta-descriptors.

11. A method for obtaining anomalous constructs from a plurality of streams of multimodal Binary Large Objects (BLOBs) of surveillance data using a system comprising a plurality of cognitive abstraction modules, whereby each cognitive abstraction module is configured to receive one of the plurality of streams of multimodal BLOBs of surveillance data, and whereby each cognitive abstraction module in the system is configured to perform the method according to claim 1.

12. A system for obtaining anomalous constructs from multimodal Binary Large Objects (BLOBs) of surveillance data, the system comprising:

a computer processor; and a non-transitory media readable by the processing unit, the media storing instructions that when executed by the processing unit, causes the processing unit to:

receive the multimodal BLOBs of surveillance data concurrently, wherein the multimodal BLOBS of data surveillance data comprise a sequence of image frames, a sequence of audio segments, and a sequence of measurements over a first time interval and a second time interval;

generate meta-descriptors for each of the multimodal BLOBs of surveillance data obtained over the first and second time intervals, wherein the meta-descriptors comprise alphanumeric characters that characterize a corresponding multimodal BLOB of surveillance data;

generate a cumulative frequency distribution of all the generated meta-descriptors obtained over the second time interval;

generate meta-descriptor embeddings for each of the generated meta-descriptors obtained over the first time interval; and identify, using an anomaly assertion model, multimodal anomalous constructs from all the generated meta-descriptor embeddings, and validating the multimodal anomalous constructs by asserting the multimodal anomalous constructs against the cumulative frequency distribution of all the generated meta-descriptors obtained over the second time interval, wherein the second time interval comprises two or more multiples of the first time interval.

13. The system according to claim 12, further comprising instructions that direct the processing unit to:

classify surveillance data associated with the validated anomalous constructs as anomalous surveillance data.

14. The system according to claim 12, wherein before the instructions to direct the processing unit to generate the cumulative frequency distribution of all the generated meta-descriptors, the system further comprises instructions that direct the processing unit to receive meta-descriptors from a meta-descriptor database.

15. The system according to claim 13, further comprising instructions that direct the processing unit to:

provide the anomalous surveillance data and the validated anomalous constructs associated with the anomalous surveillance data to a command center; and receive, from the command center, results obtained based on remediation actions taken against the anomalous surveillance data and the validated anomalous constructs, whereby these received results are used to fine-tune the anomaly assertion model.

16. The system according to claim 12, whereby when at least one of the multimodal BLOBs of surveillance data comprises the sequence of image frames, the instructions for directing the processing unit to generate the meta-descriptors for the at least one of the multimodal BLOBs of surveillance data comprises instructions for directing the processing unit to generate meta-descriptors for each of the image frames in the sequence of image frames using a generative artificial intelligence model.

17. The system according to claim 16, whereby the instructions for directing the processing unit to generate meta-descriptors for each of the image frames further comprises instructions to direct the processing unit to:
randomly select image frames from the series of image frames; and
generate meta-descriptors for each of the randomly selected image frames.

18. The system according to claim 16, whereby when at least one of the multimodal BLOBs of surveillance data further comprises the sequence of audio segments, the instructions for directing the processing unit to generate the meta-descriptors for the at least one of the multimodal BLOBs of surveillance data comprises instructions for directing the processing unit to generate meta-descriptors for each of the audio segments in the sequence of audio segments using an alphanumeric character generation model.

19. The system according to claim 16, whereby when at least one of the multimodal BLOBs of surveillance data further comprises the sequence of measurements, the instructions for directing the processing unit to generate the meta-descriptors for the at least one of the multimodal BLOBs of surveillance data comprises instructions for directing the processing unit to generate meta-descriptors for each of the measurements using an alphanumeric character generation model.

20. The system according to claim 12, wherein the cumulative frequency distribution of all the generated meta-descriptors comprises occurrences of the meta-descriptors along with temporal distributions of each of the meta-descriptors.

21. A system infrastructure for obtaining anomalous constructs from a plurality of streams of multimodal Binary Large Objects (BLOBs) of surveillance data, the system infrastructure comprising a plurality of the systems according to claim 12, whereby each system is configured to receive one of the plurality of streams of multimodal BLOBs of surveillance data.

* * * * *